March 27, 1956 — E. F. BRUNING — 2,739,855
COMPOSITE PACKING
Filed Dec. 21, 1951 — 2 Sheets-Sheet 1
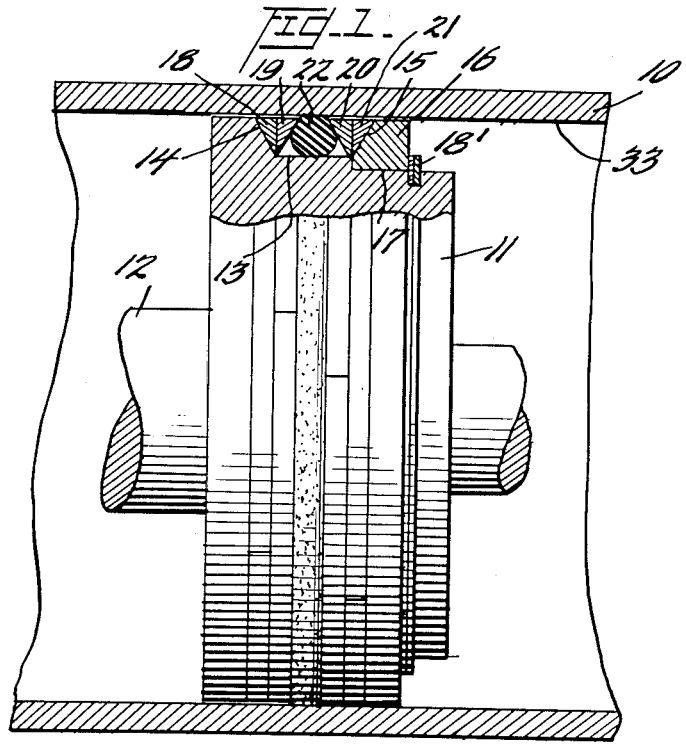
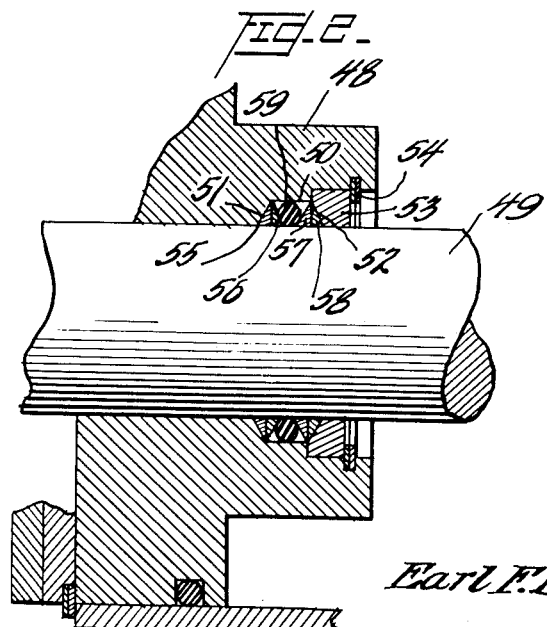
INVENTOR
Earl F. Bruning,
BY Parker and Walsh
ATTORNEYS

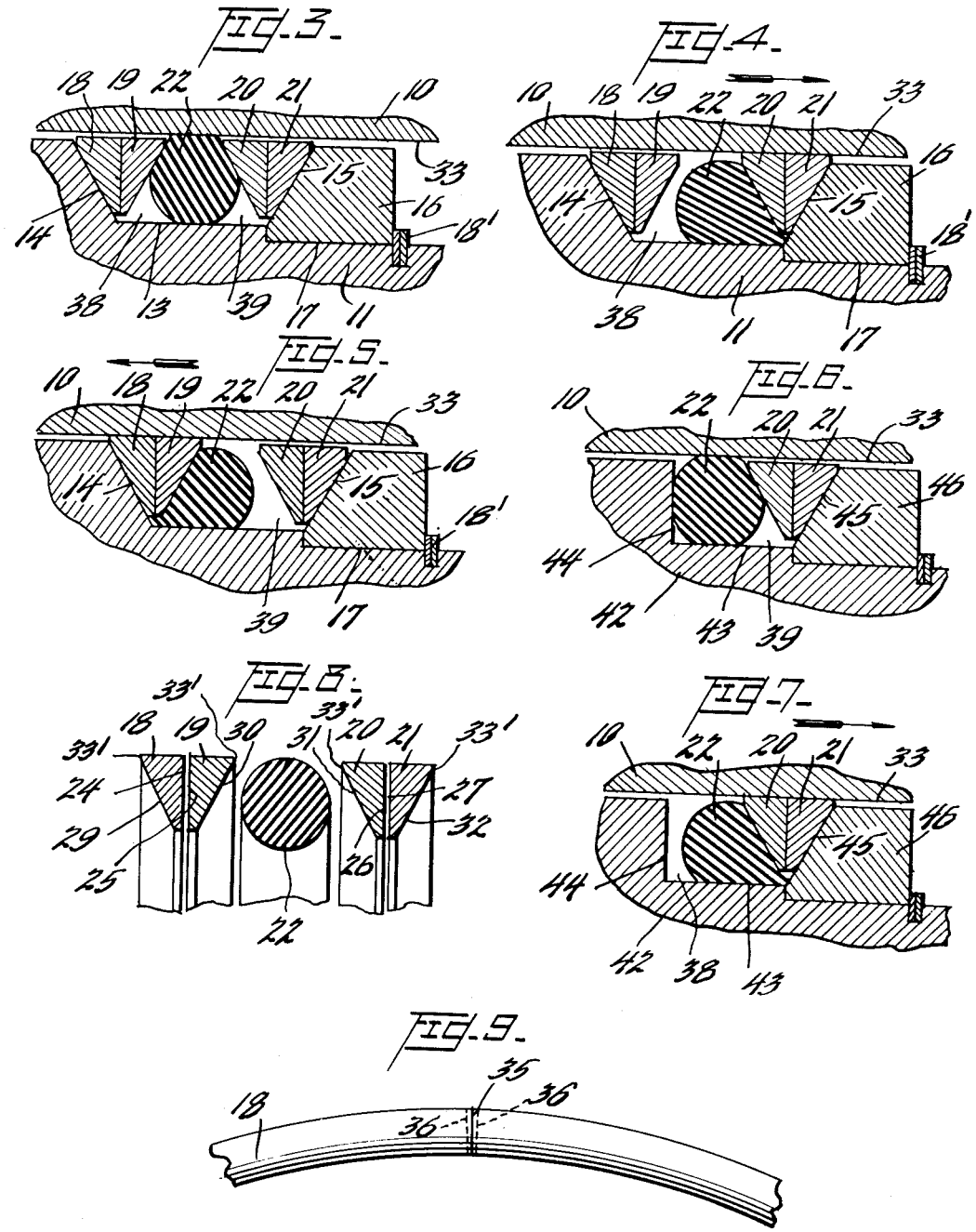

United States Patent Office 2,739,855
Patented Mar. 27, 1956

2,739,855

COMPOSITE PACKING

Earl F. Bruning, Lincoln, Nebr.

Application December 21, 1951, Serial No. 262,828

8 Claims. (Cl. 309—23)

This invention relates to pressure sealing means for relatively reciprocating members.

As is well known, a serious problem is involved in providing a perfect seal against leakage of pressure past relatively reciprocating members, for example, past the pistons of high pressure pumps, internal combustion engines, etc., and past the packing and around the rods of pistons passing through cylinder heads.

In recent years, the use of O rings has come into very general use for providing packing against pressure leakage. These rings are highly effective in many uses, but they have their limitations, particularly when subjected to high pressure conditions. For example, in packing the pistons of high pressure pumps and the like, substantial deformation of an O ring is necessary in order to prevent leakage past the piston. During reciprocating movement of the piston, the O ring moves back and forth and deforms against the end of the groove in which it is arranged and tends to be extruded around the piston. Under such conditions, the O ring is subjected to very substantial destructive wear. Numerous combinations of deformable packing rings with metallic rings have been developed in an effort to overcome the objections referred to, but while such devices involve improvements over the mere use of O rings or other deformable packing rings in the grooves of pistons and the like, they leave much to be desired so far as ultimate practicable efficiency is concerned.

An important object of the present invention is to provide a novel type of composite packing ring means which utilizes a pressure deformable packing ring of rubber or other suitable pressure deformable material to seal against leakage under static or low pressure conditions in which metallic or similar type rings of pressure non-deformable material are not efficient, and to utilize relative movements of the reciprocating parts and pressure conditions in the apparatus with which the invention is used for utilizing the deformable packing ring for increasing the sealing efficiency of the metallic or other type ring or rings.

A further object is to provide such a sealing means wherein, under pressure conditions and during movement of a reciprocating part, the pressure deformable packing ring is deformed and moves out of pressure contact with the surface past which pressure escape is to be sealed, and to utilize such deformation of the deformable packing ring for increasing the efficiency of the sealing action of the pressure non-deformable rings.

A further object is to provide a structure of this character wherein the deformation of the deformable packing rings under conditions of reciprocating movement and substantial pressures relieves the deformable ring of the substantial wear to which it otherwise would be subjected, including the extrusion of the deformable ring around the metal or other material parts with which it is associated.

A further object is to provide a combination of pressure deformable and pressure non-deformable packing rings of such nature that the pressure non-deformable rings are not in pressure contact with the surface against which they are relatively reciprocable under low pressure or static pressure conditions, thus relieving such rings from wear and minimizing or eliminating the galling or scoring of cylinder walls and the like.

A further object is to provide such a device wherein the deformation of the deformable packing ring under reciprocating and pressure conditions is utilized to positively expand the metallic or other material rings against the surface in conjunction with which they are operable, thus rendering such rings highly effective in sealing against pressure leakage.

A further object is to provide such a device wherein the deformable packing ring may be associated with metallic ring structures on opposite sides thereof to effectively pressure-seal against leakage during both reciprocating movements of relatively reciprocable members, and wherein the deformation of the deformable packing ring renders one set of metallic rings effective for sealing in one direction of reciprocation while the rings at the opposite side of the deformable ring are rendered inoperative and have their pressure against the adjacent relatively reciprocating surface relieved, thus preventing undue wear.

Other objects and advantages of the invention will become apparent during the course of the following description.

In the drawings I have shown several embodiments of the invention. In this showing, Figure 1 is a fragmentary sectional view through a cylinder having a reciprocating piston therein to which the invention is applied, portions of the piston being shown in elevation and portions being broken away, Figure 2 is a fragmentary sectional view through a cylinder head or the like showing the invention applied as a packing means surrounding a reciprocating rod, Figure 3 is a substantially enlarged fragmentary sectional view through the upper part of the piston and associated elements as viewed in Figure 1, the parts being shown in the positions they will occupy under static or low pressure conditions, Figure 4 is a similar view showing the positions of the parts during reciprocation of the piston in one direction under pressure conditions, Figure 5 is a similar view showing the positions of the parts under pressure conditions with the piston moving in the opposite direction, Figure 6 is a similar view showing a modified form of the invention showing a single set of metallic rings where it is desired to seal against pressure in only one direction, the parts being shown in the positions they will occupy under static or low pressure conditions, Figure 7 is a similar view of the modified form of the invention shown in Figure 6 showing the positions of the parts during reciprocation of the parts in the direction indicated, Figure 8 is a fragmentary sectional view through portions of the deformable packing ring and two associated sets of metallic rings, the parts being shown separated, and Figure 9 is a fragmentary side elevation of a portion of one of the metallic rings showing an ordinary type of ring joint which may be employed.

In the description which follows the terms "metallic ring" and "metallic rings" are used throughout, for purposes of simplicity, when referring to the rings which are non-deformable by fluid pressure as contrasted to the rings which are deformable by fluid pressure. However, it will be understood, that the invention is not limited in its application to the use of pressure non-deformable rings of metal and that rings formed of other pressure non-deformable materials, such as synthetic plastics, synthetic resins, for example, phenol-formaldehyde resins and the like, or mixtures of these materials with other modifying and/or strengthening materials, may be substituted for the metallic rings so long as they have the desired resiliency, strength and other required characteristics.

In Figure 1 of the drawings, I have shown the invention employed in connection with an ordinary piston operating in a cylinder. Referring to Figure 1, the numeral 10 designates a conventional cylinder in which is arranged a piston indicated as a whole by the numeral 11 and connected to a piston rod 12 of any desired type depending upon the particular apparatus with which the invention is embodied. The piston 11 is shown as being provided with a peripheral groove 13, one wall of which, as shown at 14, may be a surface of the body of the piston itself while the opposite wall 15 may be a surface of a separable ring 16 arranged in a groove 17 formed around the piston. The ring 16 may be held in position by any suitable means, for example by snap rings 18'. The surfaces 14 and 15 are inclined to diverge outwardly as shown in Figure 1 and as more clearly shown in Figures 3, 4 and 5. In actual practice it has been found that the surfaces 14 and 15 should incline approximately 30° from a plane perpendicular to the axis of the piston 11.

Sets of metallic rings 18 and 19, and 20 and 21 are arranged in opposite ends of the groove 13 and between such rings is arranged a deformable ring 22 which may be in the form of a conventional O ring. The O ring or other deformable ring may be made of any suitable material depending upon the use to which the invention may be put. For example, either natural or synthetic rubber may be employed under certain conditions while one of the silicones may be used if the device is to be employed under high temperature conditions, for example in an internal combustion engine.

As shown in Figure 1, the adjacent faces of the rings of each set 18 and 19, and 20 and 21, are preferably perpendicular to the axis of reciprocation of the piston 11. Accordingly the rings 18 and 19 are respectively provided with such adjacent faces 24 and 25 shown in Figure 8 as being spaced and parallel to each other, and these faces are normally in contact as shown for example in Figure 3. Similarly the rings 20 and 21 are provided respectively with adjacent faces 26 and 27 arranged parallel to each other and normally in engagement, also as shown for example in Figure 3. The faces 24 and 25, and 26 and 27 are machined so that the rings of each pair slide over each other relatively readily.

The remote faces of the rings 18 and 19, as indicated by the numerals 29 and 30, are inclined from the planes of the faces 24 and 25 approximately 30°, this being the preferable angle as has been found in practice. The inclination of the face 29 corresponds to the inclination of the end face 14 of the groove 13, and accordingly these faces lie in flat contact with each other, and since both of these faces are smooth machined surfaces, they are easily slidable over each other. Similarly, the remote faces 31 and 32 of the rings 20 and 21 are inclined approximately 30° from the planes of the faces 26 and 27, the inclination of the face 32 corresponding to the inclination of the face 15 so that the ring 21 is readily slidable over the face 15. The radially outer extremities of the faces 29, 30, 31 and 32 preferably terminate in relatively narrow flat faces 33'. The radial depth of the rings 18, 19, 20 and 21 is slightly less than the depth of the groove 13 and the space between such groove and the inner surface 33 of the cylinder 10 against which the metallic rings operate. This permits radial expansion and contraction for a purpose to be described. It should also be noted that the remote ring faces of each pair are inclined at the same angle so that any thrust axially of the piston will tend to produce the same radial component of force in both rings of the pair to which such thrust is applied.

Each of the metallic rings 18, 19, 20 and 21 may be provided with any type of end joint which may be desired.

In Figure 9, for example, the ring 18 is shown as being provided with an ordinary square butt joint 35. In the installation illustrated in Figure 1, the metallic rings will be resilient and will tend to contract so that the ends of the rings abut each other as shown in solid lines in Figure 9. Under conditions to be described, the metallic rings are radially expanded, in which case the ends will be slightly spaced as indicated by the dotted lines 36 in Figure 9. The joints of adjacent rings will be staggered in installing the device as will be apparent.

As previously stated, a conventional O ring 22 is preferably employed as the deformable ring of the present construction. Preferably, therefore, the ring 22 will be of circular radial cross-section as shown in Figure 8. The cross sectional diameter of this ring is slightly greater than the space between the bottom of the groove 13 and the cylinder surface 33, and accordingly when the ring 22 is at rest as viewed in Figure 3, there will be slight radial deformation of the ring 22, this ring sealing against the cylinder surface 33 to prevent leakage past the piston. Moreover, the spacing of the inclined surfaces 30 and 31 is slightly less than will be accommodated by the thickness of the ring 22, particularly as the latter is normally distorted in the manner referred to. Accordingly the surfaces 30 and 31 cause some slight additional deformation of the ring 22 as shown in Figure 3, under static pressure conditions.

Under conditions to be referred to below, movement of the piston 11 in one direction under pressure conditions results in substantial deformation of the ring 22. Referring to Figure 3 it will be noted that when the ring 22 and associated parts are at rest, there are annular pockets 38 and 39 at opposite sides of the ring 22, these pockets being formed by the ring 22, rings 19 and 20, and the bottom of the groove 13. When the piston 11 moves and assuming that substantial pressure is acting from left to right as indicated with the arrow in Figure 4, the ring 22 will be deformed as shown in Figure 4, filling the pocket 39 and exerting pressure against the adjacent ring 20. When pressure acts from right to left as in Figure 5, the annular pocket 38 will be filled, the ring 22 being substantially deformed against and within the ring 19. This action will be further referred to below.

The form of the device described above is particularly adapted for use with a piston installation in which the sealing means is subjected to pressure at opposite sides of the piston. Assuming that such pressure acts only from one side of the piston, the form of the invention shown in Figures 6 and 7 may be used. Referring to these figures, it will be noted that the piston 42 is provided with a groove 43, one end 44 of which may be perpendicular to the axis of reciprocation of the piston. The opposite end of this groove may be formed by an inclined face 45 formed on the end of a demountable ring 46 which may be identical with the ring 16 previously described. In this installation, the O ring or similar deformable packing is used only in conjunction with the rings 20 and 21 since pressure is acting solely from left to right when the device is in operation in the manner shown in Figure 7. Only the annular space 39 will appear in this form of the invention, and this space will be filled by the deformation of the O ring under pressure conditions, as shown in Figure 7 and further described below.

A somewhat different type of installation is shown in Figure 2 wherein the invention is embodied as a packing gland or similar device for use in sealing around a piston rod. Referring to Figure 2, the numeral 48 designates a piston head or the like in which a piston rod 49 is reciprocable. The cylinder head is shown as being provided with a groove 50 having opposite inclined end surfaces 51 and 52, the latter of which is formed as the inner surface of a demountable ring 53 normally held in position by any suitable means such as snap rings 54. In the groove 50 are arranged two pairs of metallic rings 55 and 56, and 57 and 58, and between these rings is arranged a deformable ring such as a conventional O ring 59. These rings in Figure 2 need not be described in specific detail since they are identical with the rings shown in Figure 3, for example, except that the radially outer surfaces of the metallic rings 53 in Figure 3 bear against the cylinder surface 33 whereas the radially inner surfaces of the metallic rings in Figure 2 bear against the surface of the rod 49. In other words, the structure and operation in Figure 2 are substantially identical with the form of the device previously described, except that movements and radial forces are reversed as will become more apparent below.

Operation

It is well known that metallic sealing rings are inefficient for sealing against leakage under static or low pressure conditions. With the present construction, the metallic rings are not depended upon to seal against leakage under the conditions referred to, as will be apparent in Figure 3. In this particular type of installation, the resilient metallic packing rings are biased to contract and normally tend to move away from the cylinder wall as shown in substantially exaggerated form in Figure 3. However, the O ring 22 is in effective sealing engagement with the cylinder surface 33 under such conditions, thereby preventing leakage.

Assuming that the device shown in Figures 1, 3, 4 and 5 is a double acting pump and the piston moves toward the left to generate pressure acting toward the right, the conditions shown in Figure 4 will then prevail. As the piston starts to move toward the left, the drag of the cylinder wall surface 33 on the O ring tends to move the latter relatively toward the right into prime engagement with the surface 31 of the ring 20. This relieves all pressure of the O ring from the surface 30 of the ring 19, and the rings 18 and 19 will both have clearance with respect to the cylinder wall surface 33. Pressure will act through this clearance into the groove 13 and will assist in the deformation of the O ring 22 substantially into the shape shown in Figure 4. This deformation of the O ring causes it to move definitely out of contact with the cylinder surface 33, thereby eliminating all wear on the O ring. The pressure of the O ring against the inclined surface 31 creates two forces against the ring 20, one such force being longitudinally toward the right and the other acting radially in view of the camming action incident to the inclined surface 31 to tend to expand the ring 20 radially. The longitudinal component of force is transmitted from the ring 20 to the ring 21 to force the latter against the surface 15, thus generating a resultant radially outward force tending to expand the ring 21. Thus both of these rings will be expanded radially into sealing contact with the cylinder surface 33 as shown in Figure 4, and these two metallic rings will provide highly effective sealing action while the O ring will not act as a seal and all pressure contact between the rings 18 and 19 against the cylinder surface 33 will be relieved. Thus there will be no wear on any of the rings except on the outer surfaces of the rings 20 and 21, these rings as indicated providing the sealing of the piston relatively to the cylinder wall. The surfaces 26 and 27 (Figure 8) are smooth so that the rings 20 and 21 slide relative to each other with substantial freedom. Thus, if it should happen for any reason that the ring 21 tends to hang on the surface 15 without properly sliding relative thereto, the surface 26 can radially slide over the surface 27 for the radial expansion of the ring 20 into sealing engagement with the cylinder wall 33. However, this will rarely happen, and in practically every instance, both rings 20 and 21 will radially expand to provide the desired sealing action.

When the piston 11 reaches the limit of its stroke toward the left and starts to move toward the right to generate pressure in the right hand end of the cylinder, the reverse operation will take place as shown in Figure 5. Pressure of the ring 22 against the rings 20 and 21 from the left will be relieved and pressure acting from the right and the natural tendency of the rings 20 and 21 to contract will cause slight movement of the rings 20 and 21 toward the left as they contract by the sliding of the ring surface 32 over the surface 15. Pressure then acting from the right will cause the deformation of the ring 22 against and within the rings 18 and 19 to expand the latter into sealing engagement with the cylinder surface 33 in exactly the same manner as described above with respect to the operation of pressures acting toward the right in Figure 4.

From the foregoing it will be apparent that under static or low pressure conditions the O ring 22 acts as a perfect pressure seal as in Figure 3 without depending upon the inefficient sealing action of metallic rings under such conditions. However, in the operation of the elements of the unit with which the invention is employed and upon the generation of substantial pressures, the O ring will not be subject to wear against the cylinder surface 33, and the entire sealing action will be performed by one pair of the metallic rings, depending upon the direction of the pressure acting to cause the operation of the sealing means. The inward deforming of the ring 22 also prevents any tendency for the extrusion of this ring between one of the adjacent rings 19 or 20 and the cylinder wall 33. Accordingly the deformable ring will last for indefinite periods, its life being much longer than the conventional installations in which attempts have been made to seal against the escape of pressures. It also will be apparent that since only one pair of the metallic rings acts at a time, wear on the other pair will be saved and wear on the cylinder wall surface 33 will be greatly minimized. The entire installation, therefore, is characterized by long life and a high degree of efficiency in operation. The present invention therefore drastically reduces wear problems common to all synthetic sealing rings. Attention is also invited to the fact that due to the inclination of the surfaces 14 and 15 and the endwise pressure of the ring 22 when the latter is deformed as shown in Figures 4 and 5, uniform radially outward forces are transmitted to the metallic rings and the latter, sliding over their associated inclined surfaces, 14 or 15, tends to always center the piston in the bore of the cylinder, thereby eliminating galling or scoring of the walls or piston.

The operation of the form of the invention shown in Figure 6 will be identical with the operation described in connection with Figure 4. The form of the device in Figure 6 is employed where it is necessary to seal against pressure only in one direction. In Figure 6, the direction of the pressure is left to right. If it is desired to seal only in the opposite direction, the parts in Figure 6, of course, will be reversed, the metal rings 20 and 21 being arranged to the left of the deformable ring 22. In the operation of the device shown in Figure 6, the application of substantial pressures from left to right causes the parts to assume the positions shown in Figure 7, these positions being identical with the positions of the deformable ring 22 and metallic rings 20 and 21 in Figure 4.

The invention has been described above with respect to its application to pistons operable in cylinders. In Figure 2 of the drawings there has been illustrated a modified installation, the operation of which will be substantially identical with that described in connection with Figures 3, 4 and 5. In this case, the deformable and metallic rings are arranged in an annular groove 50 formed in a cylinder head 48 or the like, and the wearing surfaces of the metallic rings will be radially inward instead of outward so as to bear against the surface of the rod 49. In this case, the application of pressures will simply cause radially inward movement of the sealing rings 55, 56, 57 and 58 instead of radially outward movement as in the forms of the invention described above. In the form of the device shown in Figure 2, the metallic rings of course will be resiliently biased to radially expand instead of radially contract as in the form of the invention previously described. Under low or static pressures, therefore, the metallic rings in Figure 2 tend radially to expand to relieve wearing pressures of the metallic rings against the piston rod 49. Otherwise, the operation of the form of the device shown in Figure 2 will be fully apparent from the above description.

I claim:

1. A ring assembly for sealing against pressure leakage past the adjacent surfaces of relatively reciprocable members comprising a sealing member, a member to be sealed, said member to be sealed having a surface to be sealed adjacent the surface of said sealing member, said sealing member having a portion of the said surface recessed with respect to the said surface to be sealed in order to form a groove, a side wall of said groove being inclined upwardly and outwardly with respect to the bottom of said groove whereby said groove is of a greater width adjacent the said surface to be sealed, a deformable ring in said groove having a thickness greater than the distance between the bottom of said groove and the said surface to be sealed, and a pair of split resilient, pressure non-deformable rings in said groove intermediate said deformable ring and said sloping wall of said groove and engageable therewith, said non-deformable rings being biased to tend to move away from the surface to be sealed, said non-deformable rings comprising smooth parallel surfaces perpendicular to the axis of reciprocation of said members and in slidable engagement with each other, and outer surfaces inclined upwardly and outwardly with respect to each other and the bottom of the groove, said inclined surfaces having complementary angles of inclination equal to the angle of inclination of said sloping wall of said groove, an annular pocket sufficiently large, when fluid pressure is applied to the side of the deformable ring remote from the pocket, to accommodate so much of the deformed part of the ring that the ring is withdrawn from contact with the surface to be sealed.

2. The structure of claim 1 wherein each of the sidewalls of the groove is inclined upwardly and outwardly and there is a pair of non-deformable rings on each side of a deformable ring, midway in the width of the groove.

3. The structure of claim 1 wherein the non-deformable rings are metallic.

4. The structure of claim 1 wherein the non-deformable rings are made of phenol-aldehyde plastic.

5. The structure of claim 1 wherein the sealing member is a piston and the member to be sealed is a cylinder.

6. The structure of claim 1 wherein the sealing member is a bearing and the member to be sealed is the external surface of a cylinder.

7. The elements of claim 1 wherein the non-deformable rings have narrow inner radial surfaces adjacent the floor of the groove whereby to form with the floor of the groove an additional pocket to receive a deformed portion of the deformable ring.

8. The elements of claim 1 wherein the non-deformable ring adjacent the deformable groove has a relatively narrow flat face at its radial outer extremity to minimize extrusion of the deformable ring.

References Cited in the file of this patent

UNITED STATES PATENTS

| | | |
|---|---|---|
| 2,349,170 | Jackman | May 16, 1944 |
| 2,420,104 | Smith | May 6, 1947 |
| 2,427,789 | Kehle | Sept. 23, 1947 |
| 2,462,586 | Whittingham | Feb. 22, 1949 |

OTHER REFERENCES

"Design of Hydraulic Systems" (Field), published in Product Engineering, February 1945, pages 100–104 relied upon.